United States Patent
Zones et al.

(10) Patent No.: US 9,126,190 B2
(45) Date of Patent: Sep. 8, 2015

(54) ZEOLITE SSZ-70 HAVING ENHANCED EXTERNAL SURFACE AREA

(71) Applicants: Stacey Ian Zones, San Francisco, CA (US); Tracy Margaret Davis, Novato, CA (US)

(72) Inventors: Stacey Ian Zones, San Francisco, CA (US); Tracy Margaret Davis, Novato, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 304 days.

(21) Appl. No.: 13/954,842

(22) Filed: Jul. 30, 2013

(65) Prior Publication Data

US 2015/0038322 A1 Feb. 5, 2015

(51) Int. Cl.
| | |
|---|---|
| *C01B 39/48* | (2006.01) |
| *B01J 29/70* | (2006.01) |
| *B01J 29/86* | (2006.01) |
| *C01B 37/02* | (2006.01) |

(52) U.S. Cl.
CPC ............. *B01J 29/86* (2013.01); *B01J 29/70* (2013.01); *C01B 37/02* (2013.01); *C01B 39/48* (2013.01); *C01P 2006/12* (2013.01)

(58) Field of Classification Search
CPC .......... B01J 29/70; B01J 29/86; C01B 39/48; C01B 37/02; C01P 2006/12
See application file for complete search history.

(56) References Cited

U.S. PATENT DOCUMENTS

| | | | |
|---|---|---|---|
| 6,235,258 | B1 | 5/2001 | Mueller et al. |
| 7,083,767 | B2 | 8/2006 | Zones et al. |
| 7,084,304 | B2 | 8/2006 | Zones et al. |
| 7,084,305 | B2 | 8/2006 | Zones et al. |
| 7,108,843 | B2 | 9/2006 | Zones et al. |
| 7,550,073 | B2 | 6/2009 | Zones et al. |
| 2006/0140855 | A1 | 6/2006 | Zones et al. |
| 2010/0260665 | A1 | 10/2010 | Archer et al. |
| 2012/0148487 | A1* | 6/2012 | Katz et al. ............... 423/718 |
| 2012/0202006 | A1 | 8/2012 | Rimer |
| 2015/0038322 | A1* | 2/2015 | Zones et al. ............... 502/60 |

FOREIGN PATENT DOCUMENTS

WO 03048044 6/2003

OTHER PUBLICATIONS

R.H. Archer, S.I. Zones and M.E. Davis "Imidazolium Structure Directing Agents in Zeolite Synthesis: Exploring Guest/Host Relationships in the Synthesis of SSZ-70" Microporous Mesoporous Mater. 2010, 130, 255-265.
R.H. Archer, J.R. Carpenter, S.-J. Hwang, A.W. Burton, C.-Y. Chen, S.I. Zones and M.E. Davis "Physicochemical Properties and Catalytic Behavior of the Molecular Sieve SSZ-70" Chem. Mater. 2010, 22, 2563-2572.
A.I. Lupulescu and J.D. Rimer "Tailoring Silicalite-1 Crystal Morphology with Molecular Modifiers" Angew. Chem. Int. Ed. 2012, 51, 3345-3349.
PCT International Search Report, PCT/US2014/038951, mailed Sep. 8, 2014.

* cited by examiner

*Primary Examiner* — David M Brunsman

(57) ABSTRACT

A method is disclosed for preparing zeolite SSZ-70 using an imidazolium cation as a structure directing agent in conjunction with a polyethyleneimine modifier. The SSZ-70 zeolite is characterized as having an external surface area larger than conventional SSZ-70 zeolites.

20 Claims, No Drawings

ZEOLITE SSZ-70 HAVING ENHANCED EXTERNAL SURFACE AREA

TECHNICAL FIELD

This disclosure relates a method for preparing zeolite SSZ-70 with greater direct external pore exposure over conventional forms of SSZ-70.

BACKGROUND

Zeolites are a class of important materials used in the chemical industry for processes such as gas stream purification and hydrocarbon conversion processes. Zeolites are porous solids having interconnected pores of different sizes. Zeolites typically have a one-, two- or three-dimensional crystalline pore structure that selectively adsorb molecules that can enter the pores and exclude those molecules that are too large. The pore size, pore shape, interstitial spacing or channels, composition, crystal morphology and structure are a few characteristics of zeolites that determine their use in various adsorption and hydrocarbon conversion processes.

Aluminosilicate zeolite catalysts are widely used in petrochemical and oil refining processes and in fine chemical synthesis because their strong acid sites within uniform micropores give both high activities and shape selectivities. However, their applications are limited due to the small aperture size (<2 nm) of the micropores. Increasing the accessibility of bulky molecules to and from catalytic sites can widen the range of reactions catalyzed by zeolites.

In recent years, there has been considerable effort in making microporous zeolite materials with higher surface area and, therefore, shorter path lengths to and from the catalytically active sites. Such methods include the synthesis of zeolite nanocrystals, the delamination of layered zeolites, and the introduction of mesopores into microporous material by various templating strategies or demetallation processes. Zeolites nanocrystals have been prepared only in a limited number of structures and often in low yield. Conventional delamination methods use expensive organic surfactants to effect delamination and require harsh pH conditions which can lead to partial destruction of zeolites. Concerns about the scalability, stability and regenerability of combined mesoporous/microporous materials have limited their industrial applicability. Accordingly, there is a continued need for new methods for making zeolites having higher external surface area.

Zeolite SSZ-70 is a known crystalline material and is useful in many processes, including various catalytic reactions. See, e.g., U.S. Pat. Nos. 7,083,767; 7,084,304; 7,084,305; 7,108,843; and 7,550,073. Although the crystal structure of SSZ-70 remains unknown, SSZ-70 appears to be a layered material having structural features similar to SSZ-25/MCM-22 (MWW). MWW-based catalysts are employed in various commercial processes.

U.S. Pat. No. 7,108,843 discloses the preparation of SSZ-70 in fluoride-containing media using boron and a N,N'-diisopropyl imidazolium cation structure directing agent. Post-synthetic replacement of the boron in the borosilicate SSZ-70 (B-SSZ-70) framework with aluminum was required for catalytic activity. Modest catalytic activity in acid-catalyzed hydrocarbon conversion reactions was reported, possibly due to incomplete Al-exchange.

U.S. Patent Application Publication No. 2010/0260665 discloses the direct synthesis of pure-silica, borosilicate and aluminosilicate SSZ-70 zeolites in either fluoride- or hydroxide-containing media using a variety of N,N'-disubstituted imidazolium cation structure directing agents. Aluminosilicate SSZ-70 (Al-SSZ-70) exhibited a cracking rate deactivation similar to SSZ-25 (MWW) suggesting the presence of a similar cavity, but the absence of an increasing Constraint Index value as Al-SSZ-70 deactivated suggests a second pore system distinct to the sinusoidal 10-membered ring pore system found in MWW zeolites.

Conventional forms of zeolite SSZ-70 tend to have an external surface area of less than 50 $m^2/g$. Accordingly, there is a continued need for new methods for making SSZ-70, particularly forms of this material having higher external surface area.

SUMMARY

In one aspect, there is provided a method of preparing a SSZ-70 zeolite having, after calcination to remove any organic material, an external surface area of at least 55 $m^2/g$. The SSZ-70 zeolite is prepared by contacting under crystallization conditions: (1) at least one source of at least one oxide of a tetravalent element; (2) optionally, one or more sources of one or more oxides selected from the group consisting of oxides of trivalent elements, pentavalent elements, and mixtures thereof; (3) optionally, at least one source of an element selected from Groups 1 and 2 of the Periodic Table; (4) at least one source of a mineralizing agent selected from hydroxide ions and fluoride ions; (5) an imidazolium cation selected from the group consisting of a 1,3-diisopropylimidazolium cation, a 1,3-diisobutylimidazolium cation, and a 1,3-dicyclohexylimidazolium cation; and (6) a polyethyleneimine.

The SSZ-70 zeolite synthesized according to the teachings disclosed herein has a composition, as-synthesized and in its anhydrous state, in terms of mole ratios, as follows:

| Components | Broad | Exemplary |
| --- | --- | --- |
| $YO_2/X_2O_n$ | ≥2 | 20 to 60 |
| $(Q + A)/YO_2$ | 0.02 to 0.10 | 0.02 to 0.05 |
| $F/YO_2$ | 0 to 0.08 | 0 to 0.08 |
| $M/YO_2$ | 0 to 0.03 | 0 to 0.03 | wherein: (a) Y is selected from the group consisting of tetravalent elements from Groups 4-14 of the Periodic Table, and mixtures thereof; (b) X is selected from the group consisting of trivalent elements and pentavalent elements from Groups 3-13 of the Periodic Table, and mixtures thereof; (c) n equals the valence state of X (e.g., when X is trivalent, n=3; when X is pentavalent, n=5); (d) Q is an imidazolium cation selected from the group consisting of a 1,3-diisopropylimidazolium cation, a 1,3-diisobutylimidazolium cation and a 1,3-dicyclohexylimidazolium cation, and Q>0; (e) A is a polyethyleneimine, and A>0; and (f) M is selected from the group consisting of elements from Groups 1 and 2 of the Periodic Table.

DETAILED DESCRIPTION

The following terms will be used throughout the specification and will have the following meanings unless otherwise indicated.

The term "active source" means a reagent or precursor material capable of supplying at least one element in a form that can react and which may be incorporated into the molecular sieve structure. The terms "source" and "active source" can be used interchangeably herein.

The term "Periodic Table" refers to the version of IUPAC Periodic Table of the Elements dated Jun. 22, 2007, and the numbering scheme for the Periodic Table Groups is as described in *Chem. Eng. News*, 63(5), 26-27 (1985).

The surface areas and pore volumes reported herein are calculated using nitrogen partial pressure $P/P_0$ data points ranging from about 0.03 to about 0.30 using the BET (Brunauer-Emmett-Teller) model method using the nitrogen adsorption technique as described in ASTM D-4365-95 ("Standard Test Method for Determining Micropore Volume and Zeolite Area of a Catalyst") and in the article by S. Brunauer et al., *J. Am. Chem. Soc.*, 1938, 60, 309-319. Samples are first pre-treated at 400° C. for 6 hours in the presence of flowing, dry $N_2$ so as to eliminate any adsorbed volatiles like water or organics.

In preparing SSZ-70, an imidazolium cation selected from the group consisting of a 1,3-diisopropylimidazolium cation, a 1,3-diisobutylimidazolium cation, and a 1,3-dicyclohexylimidazolium cation is used as a structure directing agent ("SDA"), also known as a crystallization template. The SDAs useful in making SSZ-70 are represented by the following structures (1), (2) and (3):

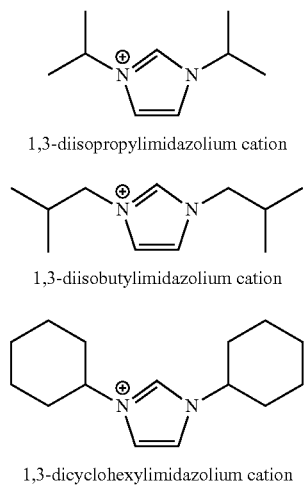

(1) 1,3-diisopropylimidazolium cation (2) 1,3-diisobutylimidazolium cation (3) 1,3-dicyclohexylimidazolium cation The SDA cation is typically associated with anions which can be any anion that is not detrimental to the formation of the zeolite. Representative anions include elements from Group 17 of the Periodic Table (e.g., fluoride, chloride, bromide and iodide), acetate, carboxylate, hydroxide, sulfate, and the like.

The SDA cation is used in conjunction with a polyethyleneimine (PEI). The PEI can be either linear or branched. Linear PEIs contain all secondary amines in contrast to branched PEIs which contain primary, secondary and tertiary amino groups. Preferred polyethyleneimines are branched polyethyleneimines. Branched polyethyleneimines of differing molecular weight are available from a number of commercial sources. Branched polyethyleneimines useful herein include those oligomers and polymers having molecular weight of not more than 5000 g/mol, e.g., branched polyethyleneimines having a molecular weight of from 250 to 2000 g/mol, from 500 to 2000 g/mol, from 1000 to 2000 g/mol, or from 1500 to 2000 g/mol.

Reaction Mixture

In general, SSZ-70 is prepared by: (a) preparing a reaction mixture containing (1) at least one source of an oxide of at least one tetravalent element; (2) optionally, one or more sources of one or more oxides selected from the group consisting of oxides of trivalent elements, pentavalent elements, and mixtures thereof; (3) optionally, at least one source of an element selected from Groups 1 and 2 of the Periodic Table; (4) at least one source of a mineralizing agent selected from hydroxide ions and fluoride ions; (5) an imidazolium cation selected from the group consisting of a 1,3-diisopropylimidazolium cation, a 1,3-diisobutylimidazolium cation and a 1,3-dicyclohexylimidazolium cation; (6) a polyethyleneimine; (7) and water; and (b) maintaining the reaction mixture under conditions sufficient to form crystals of the zeolite.

The composition of the reaction mixture from which the zeolite is formed, in terms of mole ratios, is identified in Table 1 below, wherein compositional variables Y, X, Q, A and M and stoichiometric variable n are as described herein above.

TABLE 1

| Components | Broad | Exemplary |
|---|---|---|
| $YO_2/X_2O_n$ | ≥2 | 10 to 60 |
| $Q/YO_2$ | 0.05 to 0.80 | 0.10 to 0.30 |
| $A/YO_2$ | 0.005 to 0.5 | 0.01 to 0.30 |
| $M/YO_2$ | 0 to 0.40 | 0 to 0.25 |
| $OH^-/YO_2$ | 0.1 to 0.80 | 0.2 to 0.30 |
| $F/YO_2$ | 0 to 0.80 | 0 to 0.60 |
| $H_2O/SiO_2$ | 30 to 80 | 35 to 45 |

In some embodiments, wherein the components include $M/YO_2$, the $M/YO_2$ molar ratio is from 0.05 to 0.40, e.g., from 0.10 to 0.25. In such embodiments, the $F/YO_2$ molar ratio of the reaction mixture can be zero (i.e., $F/YO_2=0$)

In some embodiments, wherein the components include $F/YO_2$, the $F/YO_2$ molar ratio is from 0.20 to 0.80, e.g., from 0.30 to 0.60. In such embodiments, the $M/YO_2$ molar ratio of the reaction mixture can be zero (i.e., $M/YO_2=0$)

For each embodiment described herein, Y is selected from the group consisting of elements from Groups 4-14 of the Periodic Table. In one sub-embodiment, Y is selected from the group consisting of silicon (Si), germanium (Ge), titanium (Ti), and mixtures thereof. In another sub-embodiment, Y is selected from the group consisting of Si, Ge, and mixtures thereof. In one sub-embodiment, Y is Si. Sources of elements selected for composition variable Y include oxides, hydroxides, acetates, oxalates, ammonium salts and sulfates of the element(s) selected for Y and X. In one sub-embodiment, each source of the element(s) selected for composition variable Y is an oxide.

Where Y is Si, sources of silicon oxide useful herein include fumed silica, precipitated silicates, silica hydrogel, silicic acid, colloidal silica, tetra-alkyl orthosilicates (e.g., tetraethyl orthosilicate), and silica hydroxides. Sources useful herein for Ge include germanium oxide and germanium ethoxide.

For each embodiment described herein, X is selected from the group consisting of elements from Groups 3-13 of the Periodic Table. In one sub-embodiment, X is selected from the group consisting of boron (B), aluminum (Al), gallium (Ga), indium (In), and mixtures thereof. In another sub-embodiment, X is selected from the group consisting of B, Al, and mixtures thereof. In one sub-embodiment, X is B; in another sub-embodiment, X is Al. Sources of elements selected for composition variable X include oxides, hydroxides, acetates, oxalates, ammonium salts and sulfates of the element(s) selected for X.

Where X is B, sources of boron oxide useful herein include borosilicate glasses, alkali borates, boric acid, borate esters, and certain molecular sieves. Non-limiting examples of a source of boron oxide include potassium tetraborate decahydrate and boron beta molecular sieve (B-beta molecular sieve).

Where X is Al, sources of aluminum oxide useful herein include aluminates, alumina, and aluminum compounds such as $AlCl_3$, $Al_2(SO_4)_3$, $Al(OH)_3$, kaolin clays, and other zeolites. An example of the source of aluminum oxide is LZ-210 zeolite (a type of Y zeolite).

As described hereinabove, the reaction mixture can include at least one source of an element selected from Groups 1 and 2 of the Periodic Table (which is referred to herein as M). In one sub-embodiment, the reaction mixture is formed using an active source of an element from Group 1 of the Periodic Table. In another sub-embodiment, the reaction mixture is formed using an active source of sodium (Na). Any M-containing compound which is not detrimental to the crystallization process is suitable. Sources for such Groups 1 and 2 elements include oxides, hydroxides, nitrates, sulfates, halides, oxalates, citrates and acetates thereof.

When used, sources of fluoride ions (F) suitable herein include hydrogen fluoride and ammonium fluoride.

The zeolite reaction mixture can be supplied by more than one source. Also, two or more reaction components can be provided by one source. For example, borosilicate zeolites can be synthesized using boron-containing beta zeolite as taught in U.S. Pat. No. 5,972,204.

The reaction mixture can be prepared either batch wise or continuously. Crystal size, morphology and crystallization time can vary with the nature of the reaction mixture and the crystallization conditions.

Crystallization and Post-Synthesis Treatment

In practice, the zeolite is prepared by (a) preparing a reaction mixture as described herein above; and (b) maintaining the reaction mixture under crystallization conditions sufficient to form crystals of the zeolite.

The reaction mixture is maintained at an elevated temperature until the crystals of the zeolite are formed. The hydrothermal crystallization is usually conducted under pressure, and usually in an autoclave so that the reaction mixture is subject to autogenous pressure, at a temperature of from 125° C. to 200° C.

The reaction mixture can be subjected to mild stirring or agitation during the crystallization step. It will be understood by one skilled in the art that the SSZ-70 zeolite described herein can contain trace impurities, such as amorphous materials, phases having framework topologies which do not coincide with the zeolite, and/or other impurities (e.g., organic hydrocarbons).

During the hydrothermal crystallization step, the zeolite crystals can be allowed to nucleate spontaneously from the reaction mixture. The use of crystals of the zeolite as seed material can be advantageous in decreasing the time necessary for complete crystallization to occur. In addition, seeding can lead to an increased purity of the product obtained by promoting the nucleation and/or formation of the zeolite over any undesired phases. When used as seeds, seed crystals are typically added in an amount between about 0.5% and 10% of the weight of the source for compositional variable Y used in the reaction mixture.

Once the zeolite crystals have formed, the solid product can be separated from the reaction mixture by mechanical separation techniques such as filtration. The crystals are water washed and then dried to obtain as-synthesized zeolite crystals. The drying step can be performed at atmospheric pressure or under vacuum.

SSZ-70 can be used as-synthesized, but typically will be thermally treated (calcined). The term "as-synthesized" refers to the SSZ-70 zeolite in its form after crystallization, prior to the removal of the organic material. The organic material can be removed by thermal treatment (e.g., calcination), preferably in an oxidative atmosphere (e.g., air or another gas with an oxygen partial pressure greater than 0 kPa) at a temperature (readily determinable by one skilled in the art) sufficient to remove the organic material from the zeolite. The organic material can also be removed by photolysis techniques (e.g., by exposing the as-synthesized zeolite product to light or electromagnetic radiation that has a wavelength shorter than visible light under conditions sufficient to selectively remove organic material from the zeolite) as described in U.S. Pat. No. 6,960,327.

SSZ-70 can be subsequently calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange or other known method and replace it with hydrogen, ammonium, or any desired metal ion.

Where the zeolite is an intermediate zeolite, the process disclosed herein includes a further step of synthesizing a target zeolite by post-synthesis techniques, such as heteroatom lattice substitution techniques and acid leaching. For example, an aluminosilicate can be synthesized from an intermediate borosilicate by post-crystallization heteroatom lattice substitution of the B for Al. Such techniques are known, for example as described in U.S. Pat. No. 6,790,433. Increased zeolite external surface area will enable a larger fraction of replacement of B for Al.

Characterization of the Zeolite

Zeolite SSZ-70, prepared according to the teachings herein, has, after calcination to remove any organic material, an external surface area greater than conventional forms of SSZ-70. In embodiments, the SSZ-70 zeolite disclosed herein has an external surface area of at least 55 $m^2/g$, e.g., at least 60 $m^2/g$. In embodiments, SSZ-70 has an external surface area of from 55 to 120 $m^2/g$ (e.g., from 55 to 100 $m^2/g$, from 60 to 120 $m^2/g$, or from 60 to 100 $m^2/g$).

SSZ-70, prepared according to the teachings herein, has a composition as-synthesized and in its anhydrous state, as shown in Table 2 (in terms of mole ratios), wherein compositional variables Y, X, Q, A and M and stoichiometric variable n are as described herein above.

TABLE 2

| Components | Broad | Exemplary |
|---|---|---|
| $YO_2/X_2O_n$ | ≥2 | 20 to 60 |
| $(Q + A)/YO_2$ | 0.02 to 0.10 | 0.02 to 0.05 |
| $F/YO_2$ | 0 to 0.08 | 0 to 0.08 |
| $M/YO_2$ | 0 to 0.03 | 0 to 0.03 |

The powder XRD pattern lines of Table 3 are representative of as-synthesized SSZ-70 made in accordance with the teachings presented herein.

TABLE 3

Characteristic Peaks for As-Synthesized SSZ-70

| 2-Theta[a] | d-Spacing, nm | Relative Intensity[b] |
|---|---|---|
| 3.32 | 2.66 | VS |
| 6.70 | 1.32 | VS |
| 7.26 | 1.22 | S |
| 8.78 | 1.01 | S |
| 13.34 | 0.664 | M |
| 20.02 | 0.444 | S |

TABLE 3-continued

Characteristic Peaks for As-Synthesized SSZ-70

| 2-Theta[a] | d-Spacing, nm | Relative Intensity[b] |
|---|---|---|
| 22.54 | 0.394 | M |
| 22.88 | 0.389 | M |
| 26.36 | 0.338 | S-VS |
| 26.88 | 0.332 | M |

[a] ±0.15
[b] The X-ray patterns provided are based on a relative intensity scale in which the strongest line in the X-ray pattern is assigned a value of 100: W = weak (>0 to <20); M = medium (20 to 40); S = strong (40 to 60); VS = very strong (>60 to ≤100).

The powder XRD pattern lines of Table 4 are representative of calcined SSZ-70 made in accordance with the teachings presented herein.

TABLE 4

Characteristic Peaks for Calcined SSZ-70

| 2-Theta[a] | d-Spacing, nm | Relative Intensity[b] |
|---|---|---|
| 7.31 | 1.21 | VS |
| 7.75 | 1.14 | VS |
| 9.25 | 0.96 | VS |
| 14.56 | 0.608 | VS |
| 15.61 | 0.568 | S |
| 19.60 | 0.453 | S |
| 21.81 | 0.407 | M |
| 22.24 | 0.400 | M-S |
| 26.30 | 0.339 | VS |
| 26.81 | 0.333 | VS |

[a] ±0.15
[b] The X-ray patterns provided are based on a relative intensity scale in which the strongest line in the X-ray pattern is assigned a value of 100: W = weak (>0 to <20); M = medium (20 to 40); S = strong (40 to 60); VS = very strong (>60 to ≤100).

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

EXAMPLES

The following illustrative examples are intended to be non-limiting.

Example 1

Synthesis of B-SSZ-70 without a PEI Modifier 4 mmol of 1,3-diisobutylimidazolium hydroxide (prepared as described in U.S. Patent Application Publication No. 2010/0260665) in 8.32 g of solution, 2 g of 1 N sodium hydroxide, 0.09 g of boric acid, 1.2 g (20 mmol) of CAB-O-SIL® M-5 fumed silica (Cabot Corporation) and 3 wt. % of SSZ-70 seeds were mixed together in a Teflon liner. The liner was capped and sealed within a 23 mL steel Parr autoclave. The autoclave was placed in a spit within an oven at a temperature of 160° C. and mixed at 43 rpm for six days. The reactor was removed from the oven and allowed to cool. The solids were collected by filtration, washed with deionized water, and allowed to dry overnight at room temperature.

The resulting product was analyzed by powder XRD, which showed the product to be SSZ-70.

The as-synthesized material had a C/N ratio of 5.50.

Example 2

Calcination of SSZ-70

The solid product of Example 1 was calcined inside a muffle furnace under a flow of 2% oxygen/98% nitrogen to 550° C. at a rate of 1° C./min and held at 550° C. for five hours. The calcined product was analyzed by powder XRD and the powder XRD pattern indicated that the material was SSZ-70.

Example 3

Synthesis of B-SSZ-70 with a PEI Modifier

Example 1 was repeated except that 0.80 g of a branched polyethyleneimine having a molecular weight of 1800 g/mol (PolySciences, Inc.) was added to the reaction mixture. The resulting product was analyzed by powder XRD, which showed the product to be SSZ-70.

The as-synthesized material had a C/N ratio of 4.35. The lower C/N value obtained in comparison to Example 1 indicates that there is some of the polyethyleneimine in the product.

Example 4

The solid product of Example 3 was calcined inside a muffle furnace under a flow of 2% oxygen/98% nitrogen to 550° C. at a rate of 1° C./min and held at 550° C. for five hours. The calcined product was analyzed by powder XRD and the powder XRD pattern indicated that the material was SSZ-70.

Physical properties of B-SSZ-70 zeolites prepared in Example 2 and Example 4 are listed in Table 5. The micropore volume, external surface area and micropore surface area of the zeolites were determined by nitrogen physisorption.

TABLE 5

Physical Properties of B-SSZ-70

| | Micropore Volume (cm$^3$/g) | External Surface Area (m$^2$/g) | Micropore Surface Area (m$^2$/g) |
|---|---|---|---|
| Ex. 2 | 0.18 | 46 | 431 |
| Ex. 4 | 0.16 | 90 | 440 |

As shown, the B-SSZ-70 zeolite prepared from a reaction mixture containing a polyethyleneimine (Ex. 4) has increased external surface area, at the loss of some internal pore volume, when compared to a B-SSZ-70 zeolite prepared from a reaction mixture in the absence of a polyethyleneimine (Ex. 2). Higher external surface area on the zeolite increases the exposed sites available for catalysis of larger molecules, e.g., hydrocarbon conversion processes such as hydrocracking.

Borosilicate zeolites, however, are not sufficiently catalytically active to be practicable for certain hydrocarbon conversion processes. Catalytically more active aluminosilicate zeolites can be prepared from their borosilicate counterparts via post-synthetic treatment. See, e.g., U.S. Pat. Nos. 6,468,501 and 6,790,433.

Example 5

Replacement of Boron with Aluminum

Calcined B-SSZ-70 (about 5 g) of Example 2 was combined with 500 g of 1 M aqueous Al(NO$_3$)$_3$ solution and treated under reflux for 100 hours. The resulting aluminum-containing SSZ-70 product was then washed with 100 mL of 0.01N HCl and then with 1 L of water, filtered and air dried at room temperature in a vacuum filter.

The resulting product had an aluminum content of 0.28 wt. % Al.

Example 6

Calcined B-SSZ-70 (about 5 g) of Example 4 was combined with 500 g of 1 M aqueous $Al(NO_3)_3$ solution and treated under reflux for 100 hours. The resulting aluminum-containing SSZ-70 (Al-SSZ-70) product was then washed with 100 mL of 0.01N HCl and then with 1 L of water, filtered and air dried at room temperature in a vacuum filter.

The resulting product had an aluminum content of 0.35 wt. % Al, a 25% increase in aluminum uptake when compared to Example 5 which was prepared without a PEI modifier. Higher aluminum uptake indicates more acid sites on the external surface of the zeolite.

Example 7

Direct Synthesis of Al-SSZ-70 without a PEI Modifier 3.48 g of tetraethyl orthosilicate (TEOS) and 0.22 g of LZ-210, a faujasite zeolite as an Al source, were added to a Teflon liner containing 9.2 mmol of 1,3-diisobutylimidazolium hydroxide in 19.2 g of solution. The liner was capped at room temperature for 2 days to hydrolyze the TEOS. The liner was then opened to evaporate off water and ethanol. The overall reaction mass was adjusted to 7 g with appropriate water addition. The liner was then sealed within a 23 mL steel Parr autoclave. The autoclave was placed in a spit within an oven at a temperature of 160° C. and mixed at 43 rpm for 5-12 days. The reactor was removed from the oven and allowed to cool. The solids were collected by filtration, washed with deionized water, and allowed to dry overnight at room temperature.

The resulting product was analyzed by powder XRD, which showed the product to be SSZ-70. The as-synthesized material had a Si content of 41.6 wt. % and an Al content of 0.89 wt. %.

Example 8

Example 7 was repeated except that the amount of TEOS was reduced to 3.14 g and the amount of LZ-210 was increased to 0.33 g.

The resulting product was analyzed by powder XRD, which showed the product to be SSZ-70. The as-synthesized material had a Si content of 41.0 wt. % and an Al content of 1.11 wt. %.

Example 9

Example 7 was repeated except that the amount of TEOS was reduced to 2.81 g and the amount of LZ-210 was increased to 0.45 g.

The resulting product was analyzed by powder XRD, which showed the product to be SSZ-70. The as-synthesized material had a Si content of 38.8 wt. % and an Al content of 1.56 wt. %.

Example 10

Example 7 was repeated except that the amount of TEOS was reduced to 2.08 g, the amount of LZ-210 was increased to 1.05 g, and the overall $H_2O/SiO_2$ molar ratio of the reaction mixture was 5.6.

The resulting product was analyzed by powder XRD, which showed the product to be SSZ-70. The as-synthesized material had a Si content of 41.3 wt. % and an Al content of 0.70 wt. %.

Example 11

Direct Synthesis of Al-SSZ-70 with a PEI Modifier

Example 7 was repeated except that 0.40 g of PEI was added as an additional reactant.

The resulting product was analyzed by powder XRD, which showed the product to be SSZ-70.

Examples 7-9 and 11 were calcined and ion-exchanged as described in Example 4. The calcined materials were examined for nitrogen uptake properties. Physical properties of Al-SSZ-70 zeolites prepared in Examples 7-9 and 11 are listed in Table 6.

TABLE 6

| Physical Properties of Al-SSZ-70 | | |
|---|---|---|
| Example | Micropore Volume (cm³/g) | External Surface Area (m²/g) |
| 7 | 0.14 | 32 |
| 8 | 0.144 | 34 |
| 9 | 0.17 | 28 |
| 11 | 0.145 | 60 |

Enhancement of the external surface area in Al-SSZ-70 can be seen as a result of adding the PEI modifier.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing zeolite SSZ-70, comprising contacting under crystallization conditions (1) at least one source of at least one oxide of a tetravalent element; (2) optionally, one or more sources of one or more oxides selected from the group consisting of oxides of trivalent elements, pentavalent elements, and mixtures thereof; (3) optionally, at least one source of an element selected from Groups 1 and 2 of the Periodic Table; (4) at least one source of a mineralizing agent selected from hydroxide ions and fluoride ions; (5) an imidazolium cation selected from the group consisting of a 1,3-diisopropylimidazolium cation, a 1,3-diisobutylimidazolium cation, and a 1,3-dicyclohexylimidazolium cation; and (6) a polyethyleneimine, wherein the zeolite has, after calcination to remove any organic material, an external surface area of at least 55 m$^2$/g.

2. The method of claim 1, wherein the zeolite has an external surface area of from 55 to 120 m$^2$/g.

3. The method of claim 1, wherein the imidazolium cation is a 1,3-diisobutylimidazolium cation.

4. The method of claim 1, wherein the polyethyleneimine is a branched polyethyleneimine.

5. The method of claim 4, wherein the branched polyethyleneimine has a molecular weight of from 500 to 2000 g/mol.

6. The method of claim 1, wherein the zeolite is prepared from a reaction mixture comprising, in terms of mole ratios, the following:

| | |
|---|---|
| $YO_2/X_2O_n$ | ≥2 |
| $Q/YO_2$ | 0.05 to 0.80 |
| $A/YO_2$ | 0.005 to 0.5 |
| $M/YO_2$ | 0 to 0.40 |
| $OH^-/YO_2$ | 0.1 to 0.80 |
| $F/YO_2$ | 0 to 0.80 |
| $H_2O/SiO_2$ | 30 to 80 | wherein
(a) Y is selected from the group consisting of tetravalent elements from Groups 4-14 of the Periodic Table, and mixtures thereof;
(b) X is selected from the group consisting of trivalent elements and pentavalent elements from Groups 3-13 of the Periodic Table, and mixtures thereof;
(c) n equals the valence state of X;
(d) Q is an imidazolium cation selected from the group consisting of a 1,3-diisopropylimidazolium cation, a 1,3-diisobutylimidazolium cation, and a 1,3-dicyclohexylimidazolium cation;
(e) A is a polyethyleneimine; and
(f) M is selected from the group consisting of elements from Groups 1 and 2 of the Periodic Table.

7. The method of claim 6, wherein Y is selected from the group consisting of Si, Ge, and mixtures thereof.

8. The method of claim 6, wherein X is B, Al, Ga, In, and mixtures thereof.

9. The method of claim 6, wherein Y is Si and X is B.

10. The method of claim 6, wherein Y is Si and X is Al.

11. The method of claim 6, wherein the zeolite is prepared from a reaction mixture comprising, in terms of mole ratios, the following:

| | |
|---|---|
| $YO_2/X_2O_n$ | 10 to 60 |
| $Q/YO_2$ | 0.10 to 0.30 |
| $A/YO_2$ | 0.01 to 0.30 |
| $M/YO_2$ | 0 to 0.25 |
| $OH^-/YO_2$ | 0.2 to 0.30 |
| $F/YO_2$ | 0 to 0.60 |
| $H_2O/SiO_2$ | 35 to 45. |

12. A SSZ-70 zeolite having a composition, as-synthesized and in its anhydrous state, in terms of mole ratios as follows:

| | |
|---|---|
| $YO_2/X_2O_n$ | 20 to 60 |
| $(Q + A)/YO_2$ | 0.02 to 0.05 |
| $F/YO_2$ | 0 to 0.08 |
| $M/YO_2$ | 0 to 0.03 | wherein:
(a) Y is selected from the group consisting of tetravalent elements from Groups 4-14 of the Periodic Table, and mixtures thereof;
(b) X is selected from the group consisting of trivalent and pentavalent elements from Groups 3-13 of the Periodic Table, and mixtures thereof;
(c) n equals the valence state of X;
(d) Q is an imidazolium cation selected from the group consisting of a 1,3-diisopropylimidazolium cation, a 1,3-diisobutylimidazolium cation and a 1,3-dicyclohexylimidazolium cation, and Q>0;
(e) A is a polyethyleneimine, and A>0; and
(f) M is selected from the group consisting of elements from Groups 1 and 2 of the Periodic Table.

13. The zeolite of claim 12, wherein Y is selected from the group consisting of Si, Ge, and mixtures thereof.

14. The zeolite of claim 13, wherein Y is Si.

15. The zeolite of claim 12, wherein X is selected from the group consisting of B, Al, Ga, In, and mixtures thereof.

16. The zeolite of claim 15, wherein X is B.

17. The zeolite of claim 15, wherein X is Al.

18. The zeolite of claim 12, wherein Q is a 1,3-diisobutylimidazolium cation.

19. The zeolite of claim 12, wherein A is a branched polyethyleneimine.

20. The zeolite of claim 19, wherein the branched polyethyleneimine has a molecular weight of from 500 to 2000 g/mol.

* * * * *